United States Patent
Vakil et al.

(10) Patent No.: US 10,482,339 B2
(45) Date of Patent: Nov. 19, 2019

(54) QUANTIFYING COMPUTER VISION ALGORITHM PERFORMANCE IN THE PRESENCE OF SYSTEM UNCERTAINTY

(71) Applicant: Government of the United States as represented by the Secretary of the Air Force, Wright-Patterson AFB, OH (US)

(72) Inventors: Mohammad I Vakil, Beavercreek, OH (US); John A Malas, Kettering, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 238 days.

(21) Appl. No.: 15/834,492

(22) Filed: Dec. 7, 2017

(65) Prior Publication Data
US 2018/0165536 A1 Jun. 14, 2018

Related U.S. Application Data

(60) Provisional application No. 62/431,865, filed on Dec. 9, 2016, provisional application No. 62/431,876, filed
(Continued)

(51) Int. Cl.
*G06K 9/03* (2006.01)
*G06T 5/00* (2006.01)

(52) U.S. Cl.
CPC .............. *G06K 9/036* (2013.01); *G06T 5/002* (2013.01); *G06T 2207/10048* (2013.01)

(58) Field of Classification Search
CPC ........ G06K 9/036; G06K 9/40; G06K 9/6262; G06T 5/002; G06T 2207/10048; G06T 7/0004
See application file for complete search history.

(56) References Cited

U.S. PATENT DOCUMENTS

| 6,847,737 B1 | 1/2005 | Kouri et al. |
| 6,879,729 B2 | 4/2005 | Kamath et al. |

(Continued)

OTHER PUBLICATIONS

Bentoutou, Youcef, et al. "A feature-based approach to automated registration of remotely sensed images." 2006 2nd International Conference on Information & Communication Technologies. vol. 1. IEEE, 2006. (Year: 2006).*
(Continued)

*Primary Examiner* — Bobbak Safaipour
(74) *Attorney, Agent, or Firm* — AFMCLD/JAZ; Chastity Whitaker (57) ABSTRACT

A method of quantifying computer vision algorithm performance. The method includes receiving a first image and a second image from an imaging system. Each of the first and second images is characterized by an image intensity value. Iteratively, an evaluation value of a noise profile is applies to the first and second images to form respective first and second composite images, and algorithm performance using the first and second composite images is measured. The measured performances are compared and an operational range of the algorithm determined. The noise profile includes at least one source of noise inherent to the imaging system.

17 Claims, 10 Drawing Sheets

Related U.S. Application Data on Dec. 9, 2016, provisional application No. 62/431,877, filed on Dec. 9, 2016.

(56) References Cited

U.S. PATENT DOCUMENTS

| | | | |
|---|---|---|---|
| 7,099,796 | B2 | 8/2006 | Hamza |
| 7,237,721 | B2 | 7/2007 | Bilcu et al. |
| 7,689,054 | B1 | 3/2010 | Repperger et al. |
| 7,940,959 | B2 | 5/2011 | Rubenstein |
| 8,073,658 | B2 | 12/2011 | Gossage |
| 8,390,444 | B2 | 3/2013 | Li et al. |
| 8,478,062 | B2 | 7/2013 | Kumar et al. |
| 8,559,746 | B2 | 10/2013 | Adams |
| 8,571,348 | B2 | 10/2013 | Kim |
| 8,711,249 | B2 | 4/2014 | Baqai et al. |
| 8,798,393 | B2 | 8/2014 | Kwatra et al. |
| 8,855,442 | B2 | 10/2014 | Owechko |
| 8,953,861 | B2 | 2/2015 | Couch et al. |
| 9,324,155 | B2 | 4/2016 | Mendonca et al. |
| 2005/0123183 | A1 | 6/2005 | Schleyer et al. |
| 2009/0219012 | A1 | 9/2009 | Nieuwenhuis et al. |
| 2010/0185064 | A1 | 7/2010 | Bandic et al. |
| 2013/0195321 | A1* | 8/2013 | Sacchi .............. G06T 7/0004 382/103 |
| 2014/0307119 | A1* | 10/2014 | Gagnon .............. G06T 5/002 348/222.1 |

OTHER PUBLICATIONS

Miller, Miranda A., Robert V. Blumer, and James D. Howe. "Active and passive SWIR imaging polarimetry." Polarization Analysis and Measurement IV. vol. 4481. International Society for Optics and Photonics, 2002. (Year: 2002).*

Shao, Guifeng, Fenghui Yao, and Mohan J. Malkani. "Aerial image registration based on joint feature-spatial spaces, curve and template matching." 2008 International Conference on Information and Automation. IEEE, 2008. (Year: 2008).*

Zhou, Yuhao, et al. "An automatic global-to-local image registration based on SIFT and thin-plate spline (TPS)." 2013 IEEE International Geoscience and Remote Sensing Symposium-IGARSS. IEEE, 2013. (Year: 2013).*

Wang, Qiang, et al. "Automatic registration of remote sensing image with moderate resolution." 2012 8th International Conference on Computing Technology and Information Management (NCM and ICNIT). vol. 1. IEEE, 2012. (Year: 2012).*

Zhang, Jixian, Guo-sheng Li, and Yu Zeng. "The study on automatic and high-precision rectification and registration of multi-source remote sensing imagery." Journal of Remote Sensing 9.1 (2005): 73-77. (Year: 2005).*

M. I. Vakil, "Information theoretic similarity measures for image registration of remotely sensed imagery," Dissertation, Univ. of Mass. Lowell (2015) 220 pages total.

* cited by examiner

QUANTIFYING COMPUTER VISION ALGORITHM PERFORMANCE IN THE PRESENCE OF SYSTEM UNCERTAINTY

Pursuant to 37 C.F.R. § 1.78(a)(4), this application claims the benefit of and priority to prior filed Provisional Application Nos. 62/431,865, 62/431,876, and 62/431,877, all filed on Dec. 9, 2016 and entitled METHOD FOR REGISTRATION OF PARTIALLY-OVERLAPPED AERIAL IMAGERY USING A REDUCED SEARCH SPACE METHODOLOGY WITH HYBRID SIMILARITY MEASURES. The contents of each of these provisional applications are incorporated herein by reference, each in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to imagery system performance measurement and, more particularly, to devices, systems, and methods for assessing and/or predicting impact of uncertainties in imagery system performance.

BACKGROUND OF THE INVENTION

Computer vision is an interdisciplinary field that deals with means of gaining high-level understanding from digital images or videos using computers instead of, and/or complementary to, a human visual system. Computer vision involves acquiring, processing, analyzing, and understanding digital images, as well as extracting high-dimensional data from real-world imagery, to produce numerical or symbolic information. As a scientific discipline, computer vision is concerned with the theory behind artificial systems that extract information from images and includes the fields of image registration, change detection, and pattern recognition in remotely sensed imagery.

Computer vision systems typically employ algorithms (e.g., computer-implemented instructions) that operate on input image data. The input image data may be captured by any number of imaging sensors currently known in the art, each with potentially varying performance capabilities for remote collection of image data. Depending on a particular sensor's design, the configuration of a hosting platform, and the sensing environment, a variety of environmental, sensor, system, and other uncertainties can corrupt the images collected so that post-processing techniques (such as similarity measures for image registration and template matching in pattern recognition) can be affected. A computer vision solution manufactured to operate in a first scenario (e.g., component design, hosting platform, sensing environment), but deployed in a second scenario can lead to algorithm failure, which can be expensive, mission-threatening, or both.

To improve the versatility of a computer vision design, the algorithm employed and the system in which the algorithm operates should implement methods and designs making them more resilient. That is, both should be able to receive data from different sensors, in different environments, on different platforms, and still perform effectively in the presence of different types of uncertainties. Improving the versatility of the system and the algorithm employed, however, requires knowing of their limitations and implementing adaptive designs so that their performance can be improved.

Signal noise may be a significant contributing factor to these uncertainties. Noise may be represented mathematically, either through theoretical or empirical methods. The types of noise may also be modeled as an additive component affecting image intensities collected by the imaging system. For modeling purposes, image intensities of an observed image, $\vec{A}_{i,j}$, may be defined as the sum of true intensities, I:

$$\vec{A}(x_i, y_i) = \sum_{x_i, y_i} \vec{I}(x_i, y_i) + \vec{n_1}(x_i, y_i) + \vec{n_2}(x_i, y_i) \ldots + \vec{n_k}(x_i, y_i) \quad \text{Equation 1}$$

wherein $\vec{n}_k(x_i, y_i)$ represents a noise source, k, associated with one or more of the uncertainties mentioned above. Noise may be represented as $\vec{N}(x_i, y_i)$ and as the sum k. In so doing, Equation 1 may be simplified:

$$\vec{N}(x_i,y_i) = \vec{n}_1(x_i,y_i) + \vec{n}_2(x_i,y_i) \ldots + \vec{n}_k(x_i,y_i) \quad \text{Equation 2}$$

To show the effects of noise on image intensity, Equation 2 can be substituted in Equation 1:

$$\vec{A}(x_i, y_i) = \sum_{x_i, y_i} \vec{I}(x_i, y_i) + \vec{N}(x_i, y_i) \quad \text{Equation 3}$$

Generally, filtering $A(x_i, y_j)$ to remove the corrupting noise component, $\vec{N}(x_i, y_j)$, would restore the image to the desired, noiseless form, $I(x_i, y_j)$. However, neither $I(x_i, y_j)$ nor $N(x_i, y_j)$ are deterministic signals, which means filtering to remove $\vec{N}(x_i, y_j)$, may be challenging, even when the noise sources are known.

Therefore, a need exists for characterizing limitations associated with an imaging system, and particularly the computer vision algorithm(s) it employs, to improve decision-making regarding system design, manufacturing, operation, tuning, and deployment.

SUMMARY OF THE INVENTION

The present invention overcomes the foregoing problems and other shortcomings, drawbacks, and challenges of evaluating performance of computer vision algorithms as a function of noise. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a method of quantifying computer vision algorithm performance includes receiving a first image and a second image from an imaging system. Each of the first and second images is characterized by an image intensity value. Iteratively, an evaluation value of a noise profile is applied to the first and second images to form respective first and second composite images, and algorithm performance using the first and second composite images is measured. The measured performances are compared and an operational range of the algorithm determined. The noise profile includes at least one source of noise inherent to the imaging system.

Other embodiments of the present invention may be directed to a system for determining an operational range of a computer vision algorithm of an imaging system. The system includes a processing module that is configured to receive a first image and a second image from an imaging system. The processor, iteratively, applies an evaluation value of a noise profile to the first and second images to form respective first and second composite images and measures algorithm performance using the first and second composite images. The processor compares measured performances and determines an operational range of the algorithm. The noise profile includes at least one source of noise inherent to the imaging system.

Still other embodiments of the present invention are directed to an imaging system that includes an imaging sensing module and a process. The imaging sensing module is configured capturing a target image. The processor derives a first image and a second image from the target image and iteratively, applies an evaluation value of a noise profile to the first and second images to form respective first and second composite images and measures algorithm performance using the first and second composite images. The processor compares measured performances and determines an operational range of the algorithm. The noise profile includes at least one source of noise inherent to the imaging system.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The present invention will now be described with reference to the accompanying drawings and according to various embodiments. This invention may, however, be embodied in many different forms and should not be construed as limited to the embodiments set forth herein. Rather, these embodiments are provided so that this disclosure will be thorough and complete and to fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure.

Figure 1:
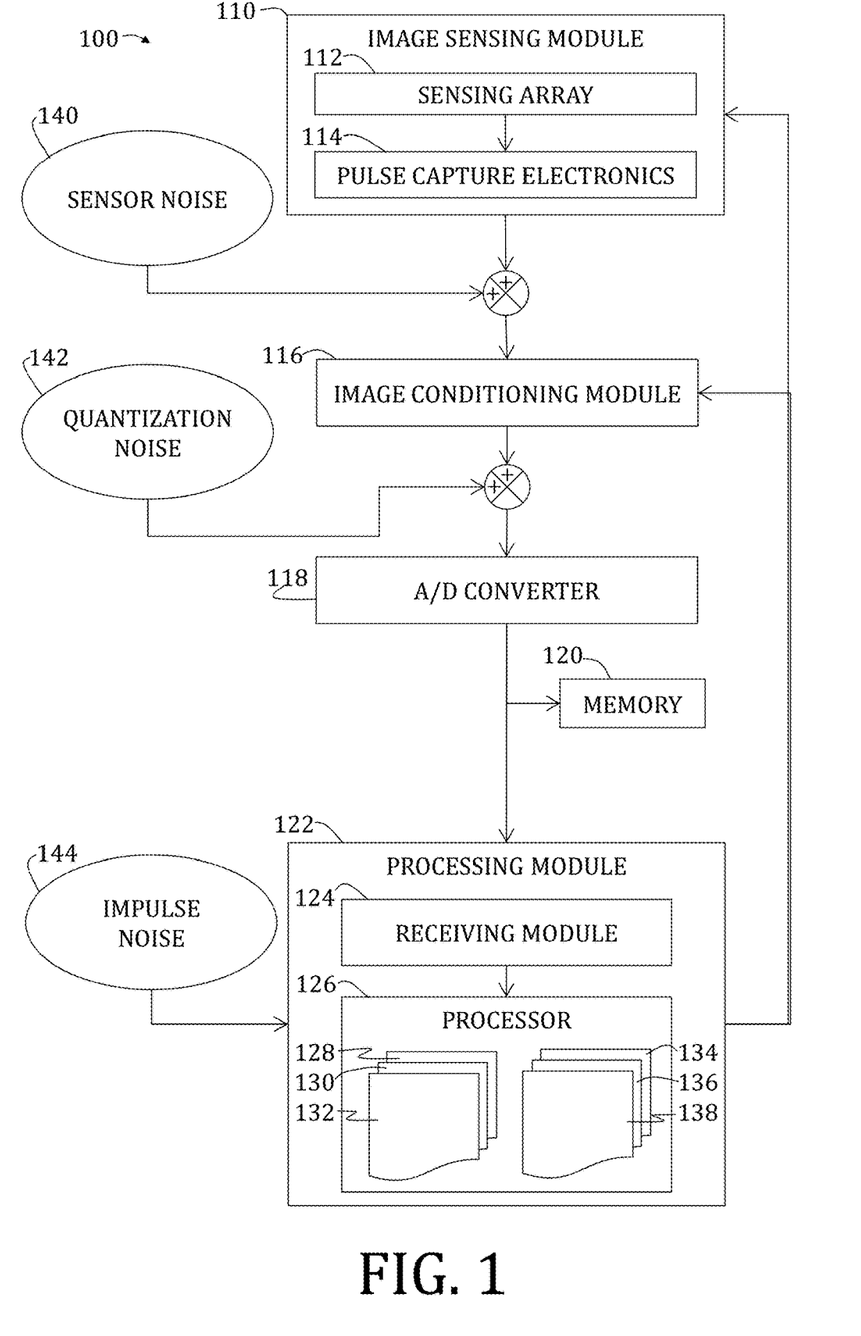
FIG. 1 is a schematic, block diagram of an exemplary computer vision system suitable for use with embodiments of the present invention and noise-contributing stages thereof.

Referring now to the figures, and in particular to FIG. 1, a high-level system block diagram for an imaging system 100 according to some embodiments of the present disclosure is shown. The illustrative imaging system 100 includes an image sensing module 110 having a sensor array 112 (e.g., focal plane array) configured to capture image data in the visible spectrum, the invisible spectrum, or both. The sensor array 112 may include an array of sensors, wherein each sensor includes a plurality of rows of pixels and a plurality of columns of pixels that are responsive to visible light, invisible light, or both. The image sensing module 110 may further include pulse capture electronics 114—such as a readout integrated circuit—configured to read image information provided by sensor array 112 and to translate the image information into an electrical signal.

An image conditioning module 116 may be operably coupled to the image sensing module 110 and configured to filter, amplify, or both the electrical signal provided by the pulse capture electronics 114 prior to digitization by a digitizer module (illustrated as an A/D converter 118). The image conditioning module 116 may include a variety of low pass filters, bandpass filters, and high pass filters, as well as low noise and other forms of amplifiers for conditioning electrical signals prior to digitization.

As noted above, the A/D converter 118 is configured to digitize the electrical signal associated with image information captured by the image sensing module 110. This digitized image data may be recorded, stored, or both in memory 120 for later processing. Alternatively or additionally, the digitized image data may be provided to a processing module 122.

The processing module 122, as shown, includes a receiving module 124 that may be configured to receive digitized image data from the A/D converter 118. The processing module may further include a processor 126 configured to execute one or more algorithms 128, 130, 132, 134, 136, 138. One such algorithm 128 may be a computer vision algorithm configured to post-process image data. Another algorithm 130 may be configured to pre-process image data (such as a Gaussian filter) for conditioning the image data prior to processing by the computer vision algorithm 128. The processor 126 may be configured to select one or more of these algorithms 128, 130, 132, 134, 136, 138 by determining an image intensity value associated with a target image (described below) and on the pre-determined operational ranges of the algorithms 128, 130, 132, 134, 136, 138. Selections may be made by an operator of the imaging system 100 or by a variety of automated, computational techniques known within the art.

The processor 126 may be further configured to monitor sources of noise in imaging system 100, such as by monitoring a noise level in the electrical signal or image data. In response to the noise level, the processor 126 may be configured to adjust one or more parameters associated with the image sensing module 110, the A/D converter 118, or both, apply the algorithm 130 to pre-process the image data, or apply the algorithm 128 to post-process the image data as described in detail below.

The sources of noise monitored by the processor 126 may include: a sensor noise source 140, a quantization noise source 142, and an impulse noise source 144, which may be additive noise sources in the imaging system 100.

The sensor noise source 140 may represent noise originating in the image sensing module 110 (for example, flicker noise, thermal noise, photon shot noise, reset/switching noise, and amplifier noise). Thus, sensor noise may contribute to uncertainties in the image data provided by imaging sensing module 110. For example, in an ideal state, pixels of the sensor array 112 will have no charge. If thermal noise is present within the image sensing module 110, an initial charge may be detected on the pixels in the ideal reset state, which can distort image intensity values associated with the pixels.

These thermally-induced uncertainties may be referred to as "reset noise" and may be quantified as kT/C, where k=is Boltzman's constant, T is absolute temperature (in Kelvin), and C is the capacitance associated with the pixel. Other sensor noise sources 140 may include other electronic devices, such as the pulse capture electronics 114 that give rise to flicker noise. Contaminated or cracked surfaces of any integrated circuit within the image sensing module 110, conductance and carrier density fluctuations in carbon resistors, electromigration of metal atoms in conductors or interstitial atoms in the silicon, and so forth may be potential sources of flicker noise, which is additive to the thermal noise.

The quantization noise source 142 may represent noise associated with the A/D converter 118. Quantization noise limits the signal strength that can be digitized by the A/D converter 118 and can be modeled as an additive noise source in the imaging system 100. Quantization noise can manifests itself as a random process uncorrelated with either the signal-to-electronic signal to be digitized or other sources of noise in image sensing module 110.

The impulse noise source 144 may represent synchronization errors caused by image quantization or transmission between various modules 110, 116, 118, 122 of the imaging system 100. Other possible sources 144 of impulse noise may include a glitch in the imaging sensor array or memory cell failures. Impulse noise is sometimes referred to as "salt and pepper noise" because the noise manifests as black and white dots superimposed on the image. Impulse noise may be digitized as extreme values in the image data. For example, a 10-bit image may include a negative spike resulting from impulse noise that will be assigned a value of 0 (black pixel on the image) while a positive spike resulting from impulse noise will be assigned a value of 1024 (white pixel on the image). Impulse noise may also be known as "bipolar impulse noise," "data-drop-out," or "spike noise."

Because of one or more uncertainties, the processor 126 can be configured to determine the operational range of imaging system 100 by, for example, determining or characterizing the operational range of one or more of the computer vision algorithms 191, 192, 193 employed thereby. When the image intensity value(s) associated with one or more target images is outside the operational range of the imaging system 100 or a pre-selected computer vision algorithm, such as computer vision algorithm 191, processor 190 can control image conditioning module 116 to adjust the intensity value(s) to be within their operational range. Processor 190 may also, or in the alternative, select, based on the image intensity value(s), another computer vision algorithm 192, 193 so as to adjust the operational range of imaging system 100.

Processor 190 can be configured to control imaging sensing module 110 by, for example, adjusting one or more parameters controlling the image conditioning module 116. Such parameters can relate to increasing the gain on a low noise amplifier or selectively applying one or more filters. Processor 190 can be further configured to apply one or more pre-processing routines to image data prior to post-processing by computer vision algorithm 191, 192, 193. In both cases, such operations can adjust the image intensity value(s) to bring it within the desired operational range of imaging system 100. A variety of filters and signal processing routines can be employed to adjust the image intensity value. For example, in some embodiments, a high pass, bandpass, or low pass filter can be used. In others, a filter and signal processing routine can be configured to compensate or reduce the effects of one or more noise sources.

For example, a signal processing routine 194 can be configured to apply a Gaussian filter to the one or more target images to filter a white noise source while preserving edge content contained in an image. Examples of a white noise source may be included as a quantization noise source 142. A Gaussian filter can be applied by creating a Gaussian wavelet mask to be applied to the one or more target images prior to operation on the images by one or more of the computer vision algorithms 191, 192, 193. Other filters and signal processing routines can also be configured and applied based on the teachings herein and explained more fully below with reference to one or more sources of noise. It will be appreciated that they can be selectively applied by an operator of imaging system 100 or a variety of automated techniques known in the art.

Figure 2A:
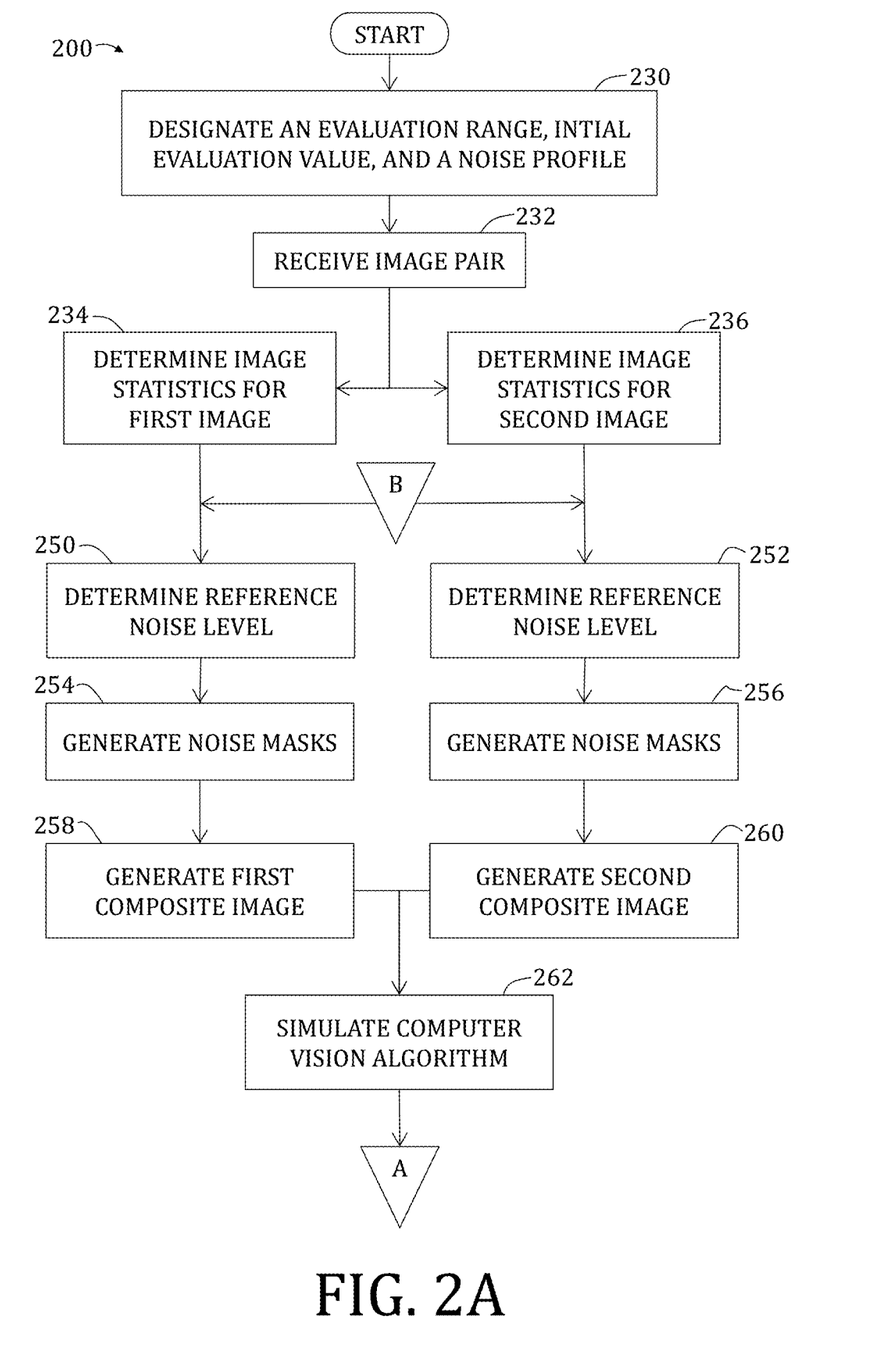
FIGS. 2A and 2B are a flowchart illustrating a method for determining the operational range of an imaging system and computer vision algorithm used thereby according to an embodiment of the present invention.
Figure 2B:
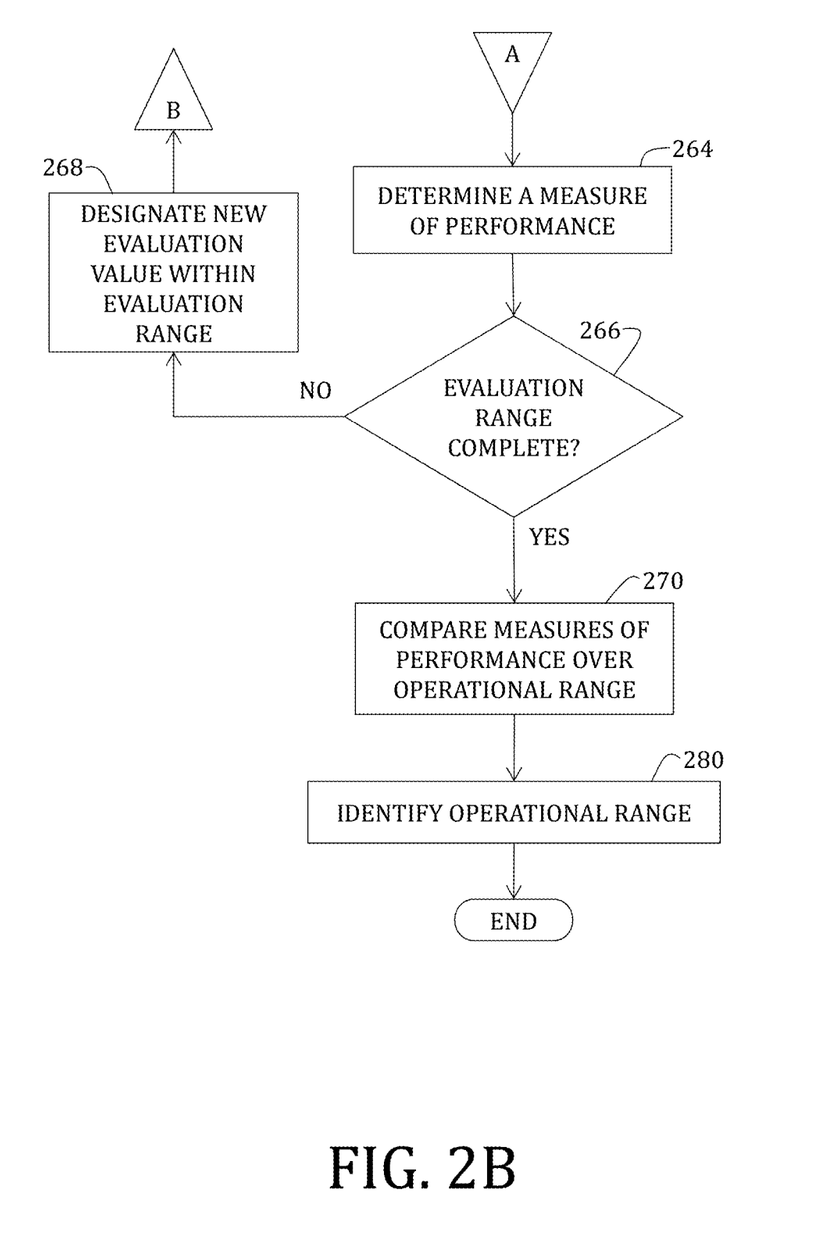

In view of the foregoing, and referring now to FIGS. 2A and 2B, a method 200 for evaluating a computer vision algorithm employed by the imaging system 100 (FIG. 1) according to an embodiment of the present invention is shown. The computer vision algorithm may be applied to any image data, including, for example, remotely sensed imagery, medical imagery, or imagery, for purposes of surveillance and reconnaissance, or in any other imaging application where one or more noise sources are present and impact the performance of the imaging system, computer vision algorithm, or both. According to exemplary embodiments, the computer vision algorithm may be for pattern recognition, change detection, and image registration, or used as a component of such algorithms, such as a rotational transform algorithm used as part of an image registration algorithm.

One or more steps of the method 200 shown in FIGS. 2A and 2B may be fully or partially performed on practically any properly configured device (including a computer 202), a programmable device that is a part of the imaging system 100 (such as the processor 126), which may be hosted on any platform, including aircraft, a ground vehicle, or a space vehicle. Alternatively, steps of the method 200 may be performed on a user configured device such as a handheld device, a network device, a mobile phone, and the like.

Details of the exemplary computer 202 suitable for performing the method 200 of FIGS. 2A and 2B is described with reference to FIG. 3. The illustrative computer 202 may be considered to represent any type of computer system, computing system, server, disk array, or programmable device such as multi-user computers, single-user computers, handheld devices, networked devices, or embedded devices, etc. The computer 202 may be implemented with one or more networked computers 204 using one or more networks 206, e.g., in a cluster or other distributed computing system through a network interface (illustrated as NETWORK I/F 208). The computer 202 will be referred to as "computer" for brevity's sake, although it should be appreciated that the term "computing system" may also include other suitable programmable electronic devices consistent with embodiments of the invention.

The computer 202 typically includes at least one processing unit (illustrated as CPU 210) coupled to a memory 212 (which may be, in some embodiments, the same as the memory 120 (FIG. 1) operably coupled to the imaging system 100 (FIG. 1)) along with several different types of peripheral devices, e.g., a mass storage device 213 with one or more databases 214, a user interface 216 coupled to a user input 218 and a display 220, and the Network I/F 208. The memory 212 may include dynamic random access memory ("DRAM"), static random access memory ("SRAM"), non-volatile random access memory ("NVRAM"), persistent memory, flash memory, at least one hard disk drive, and/or another digital storage medium. The mass storage device 213 is typically at least one hard disk drive and may be located externally to the computer 202, such as in a separate enclosure or in one or more networked computers 204, one or more networked storage devices (including, for example, a tape or optical drive), and/or one or more other networked devices (including, for example, a server 222).

The CPU 210 may be, in various embodiments, a single-thread, multi-threaded, multi-core, and/or multi-element processing unit (not shown) as is well known in the art. In alternative embodiments, the computer 202 may include a plurality of processing units that may include single-thread processing units, multi-threaded processing units, multi-core processing units, multi-element processing units, and/or combinations thereof as is well known in the art. Similarly, the memory 212 may include one or more levels of data, instruction, and/or combination caches, with caches serving the individual processing unit or multiple processing units (not shown) as is well known in the art.

The memory 212 of the computer 202 may include one or more applications (illustrated as APP. 224), or other software program, which are configured to execute in combination with the Operating System (illustrated as OS 226) and automatically perform tasks necessary for performing the method of FIG. 1, with or without accessing further information or data from the database(s) 214 of the mass storage device 213.

Figure 3:
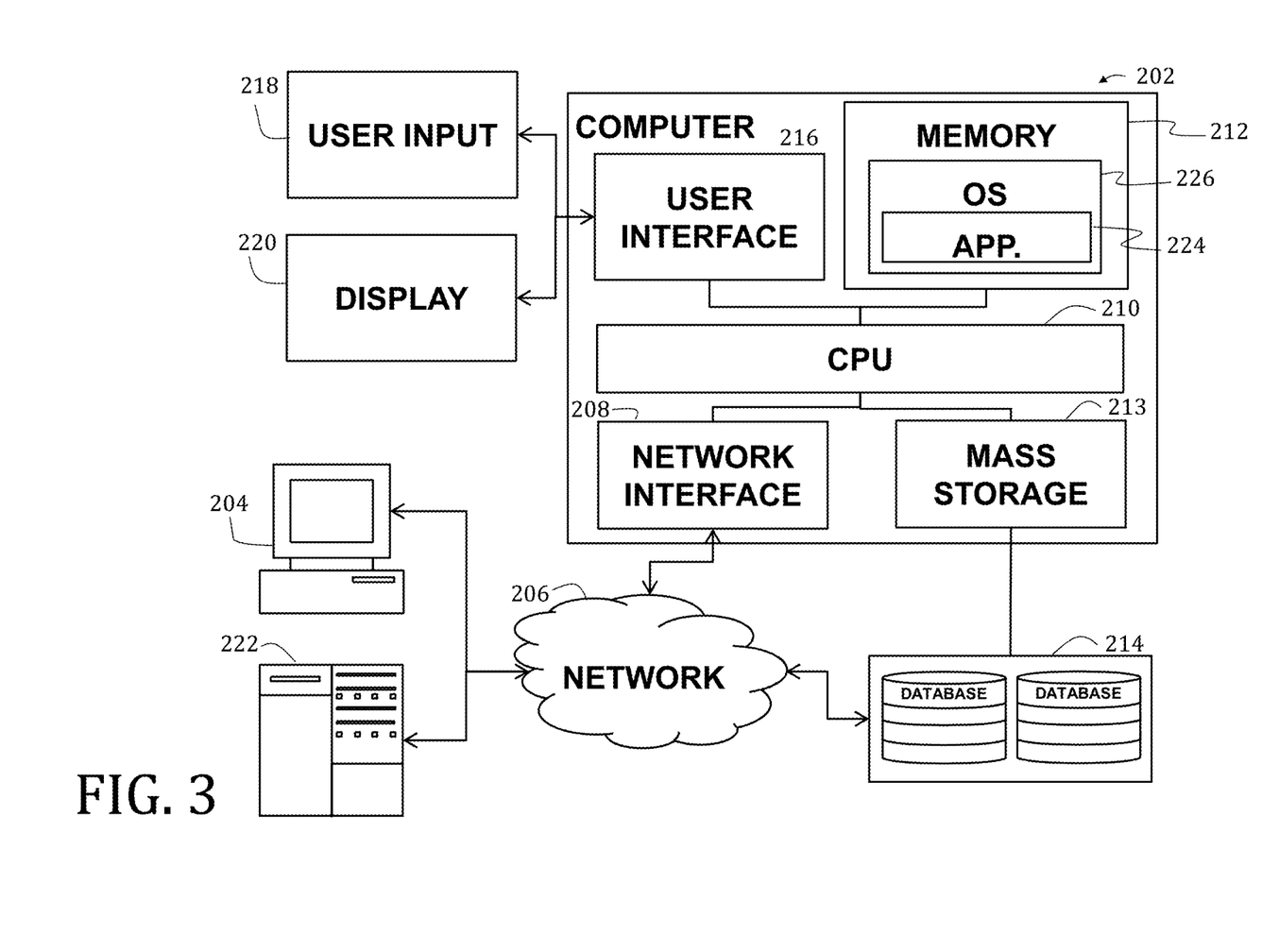
FIG. 3 is a schematic, block diagram of a computer suitable for use with embodiments of the present invention.

Those skilled in the art will recognize that the environment illustrated in FIG. 3 is not intended to limit the present invention. Indeed, those skilled in the art will recognize that other alternative hardware and/or software environments may be used without departing from the scope of the invention.

Referring again to FIGS. 2A and 2B, and at start, an evaluation range, an initial evaluation value that is within the evaluation range, and a noise profile are designated (Block 230). An image pair is also received (Block 232), wherein performance of the computer vision algorithm is determined using the received image pair. As a result, the image pair has an image character that is determined by the algorithm in the presence of noise, wherein the image character may include, but is not limited to, image registration, template matching, pattern recognition, change detection, and so forth. The evaluation range may broad or narrow, depending on the intended operational range of the imaging system. For example, an evaluation range may be SNR ranging from 0 dB to 30 dB. Within this evaluation range, the initial evaluation value is set. The initial evaluation value may be, for example, large (e.g., 30 dB), small (e.g., 0 dB), or otherwise within the evaluation range. For purposes of illustration, the initial operational range is 1 dB and determination other initial values would be readily understood by the skilled artisan. The noise profile may include, for example, mathematical representations of one or more of the sources of noise 140, 142, 144 (FIG. 1), sources of noise other than those illustrated in FIG. 1, and an indication of whether the sources are additive or multiplicative.

The image pair may include a first image (i.e., a registered image, but also known in the art as an "input image" or a "reference image," and a second image (i.e., an unregistered image). In some embodiments, the first image may include a fixed image while the second image may include a moving image, a fixed image, or a plurality of images. The first and second images may contain hyper-spectral or multi-spectral image data from any part of the visible spectrum or the invisible spectrum. Each of the first and second images of the image pair may be acquired from the same imaging system (e.g., the same image sensor) at different times, perspectives, or other circumstances. Alternatively, or additionally, each of the first and second images of the image pair may also be acquired from different imaging systems, different imaging sensors of the same imaging system, or other differing circumstances.

For purposes of simplicity and illustration, both the first and second images will be treated as being fixed images acquired from the sensor array 112 (FIG. 1) of the imaging system 100 (FIG. 1). As a result, and is generally known of images captured by the same sensor array 112 (FIG. 1) the first and second images will have the same number of rows ("M") and the same number of columns ("N"). However, the skilled artisan will immediately appreciate from the disclosure herein that embodiments may be applied to images of differing resolutions (matrix size).

After the image pair is received (Block 232), the first and second images are separately processed by determining image statistics thereof (Block 234, Block 236). Image statistics may include, for example, image intensity values for the respective first and second images, which may be presented as pixel intensity values or average peak SNR values. For purposes of illustration alone, the image intensity values for the first and second images may be average intensity value for a subset of peak intensity values, which may be determined through a series of matrix operations on image data for the first and second images.

Figure 4:
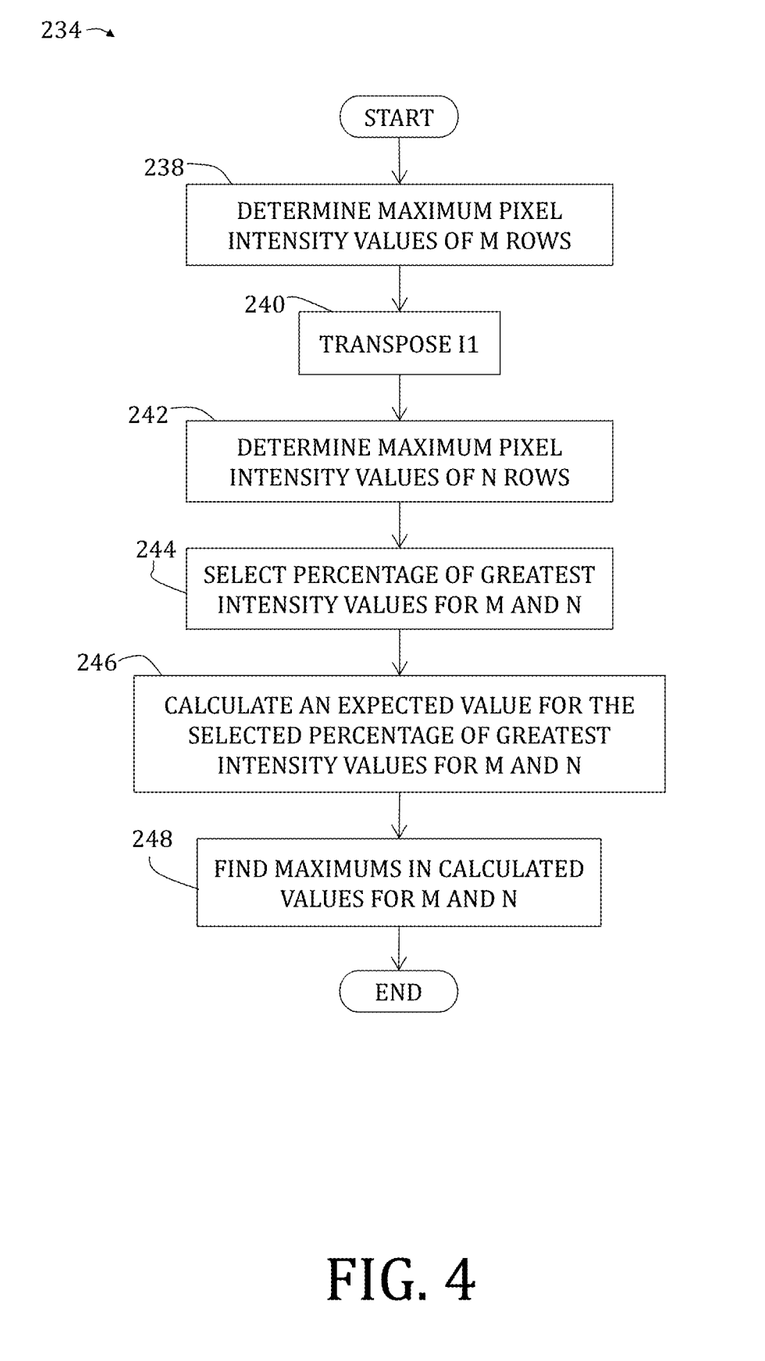
FIG. 4 is a flowchart illustrating a method of determining image statistics for each image of an image pair according to embodiments of the present invention.

For purposes of simplicity and illustration, determining image statistics for the first image (Block 234) is described in greater detail according to a first embodiment in FIG. 4. Presuming the first image comprises a matrix of image data, $I1_{M \times N}$, then each row of the plurality has a maximum pixel intensity value for a total of M pixel intensities: $\vec{P}_M$ (Block 238). The image matrix, $I1_{N \times M}$, may then be transposed (Block 240), $I1_{N \times M}{}^T$, and a maximum pixel intensity value in each transposed row (previously the columns) may be determined for a total of N pixel intensities, $\vec{P}_N$ (Block 242). A percentage (such as 10%) of the greatest values both in $\vec{P}_M$ and $\vec{P}_N$ are selected: $\vec{P}_{M10}$ and $\vec{P}_{N10}$, respectively (Block 244). Doing so ensures that a few peak values (which may be outliers in $I1_{M \times N}$) do not dominate the calculations for an average peak value associated with the image.

An expected value of the selected percentage of the greatest values may then be determined (Block 246):

$$M_{PM} = E[\vec{P}_{M10}] \quad \text{Equation 4}$$

$$M_{PN} = E[\vec{P}_{N10}] \quad \text{Equation 5}$$

and maximums of the expected values may then be found (Block 248):

$$M = \max(M_{PM}, M_{PN}) \quad \text{Equation 6}$$

Using the initial evaluation value designated in Block 230 and the image statistics for the first and second images determined in Block 234 and Block 236, a reference noise level may be determined (Block 250, Block 252). Said another way, the reference noise level is calculated using the initiate operational range (as described herein, an SNR of 1 dB) and the maximums of the expected values (Equation 6). This reference noise level may represent a SNR for the greatest value of the image statistics for the particular image (whether the first or second image).

Continuing with reference still to FIG. 2A, noise masks may be generated (Block 254, Block 256). To do so, a plurality of images (for example, 512) is generated, wherein each image of the plurality has the same dimensions as I1 or I2, respectively (e.g., has M rows and N columns), for each designated noise profile. For example, when evaluating sensor noise sources 140 (FIG. 1), a plurality of images, $SN_{M \times N}$, are generated; when evaluating quantization noise sources 142 (FIG. 1), a plurality of images, $QN_{M \times N}$, are generated; when evaluating impulse noise sources 144 (FIG. 1), a plurality of images, $IN_{M \times N}$, are generate; and so forth.

Figure 5A:
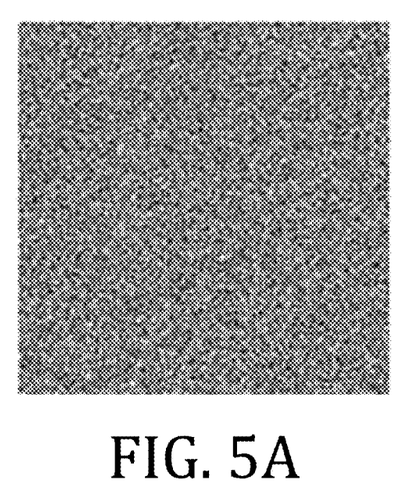
FIG. 5A is an exemplary 128×128 pixel mask.
Figure 5B:
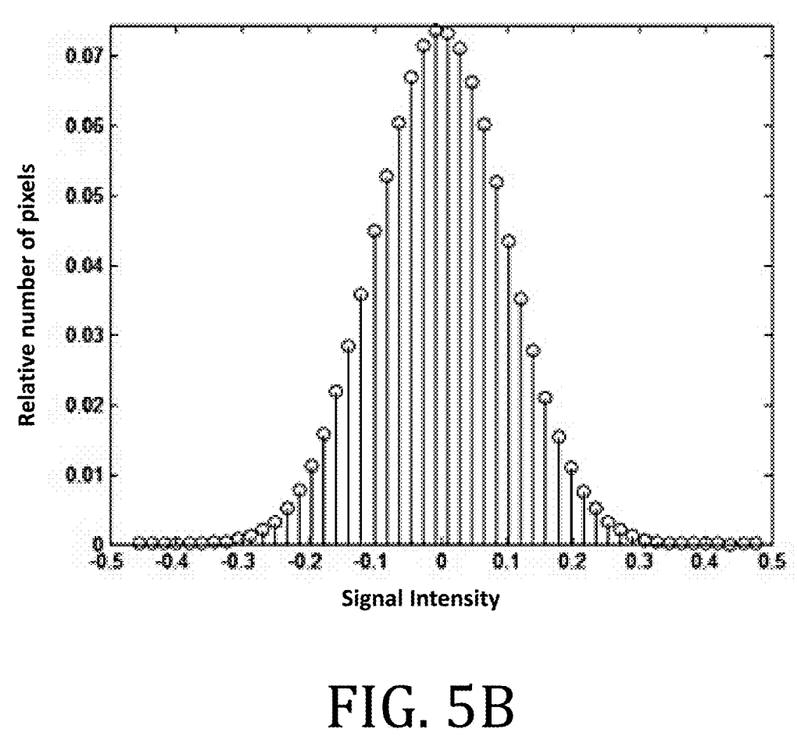
FIG. 5B is a graphical representation of sensor noise distribution as employed by the method of FIGS. 2A and 2B with the mask of FIG. 5A.
Figure 6A:
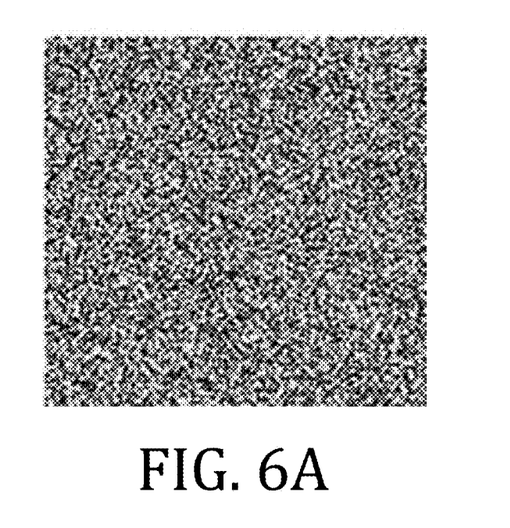
FIG. 6A is an exemplary 128×128 pixel mask.
Figure 6B:
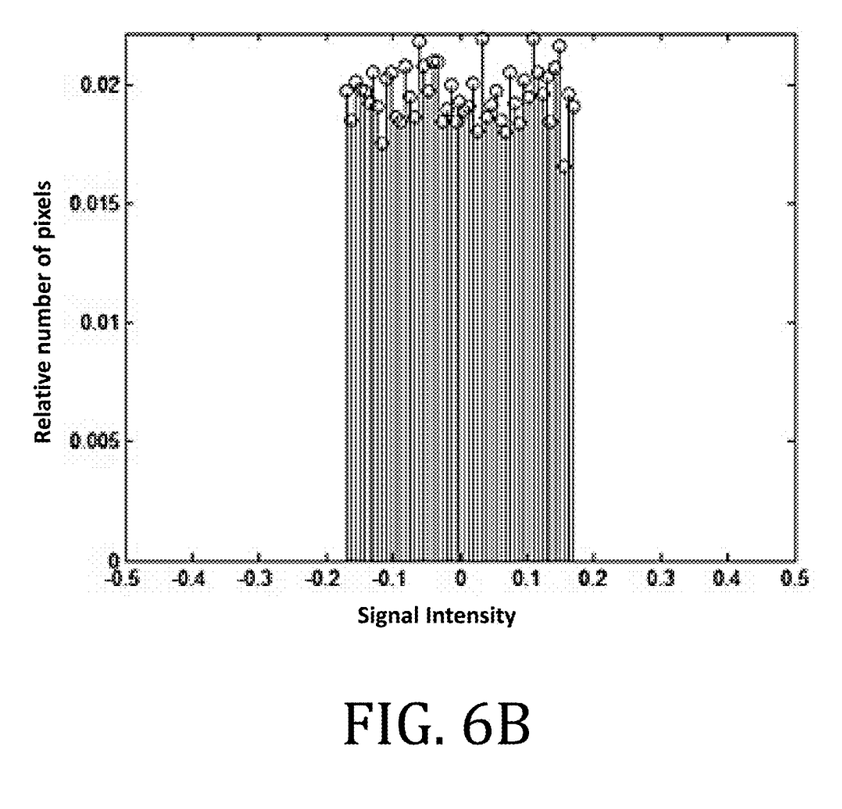
FIG. 6B is a graphical representation of quantization noise distribution as employed by the method of FIGS. 2A and 2B with the mask of FIG. 6A.
Figure 7A:
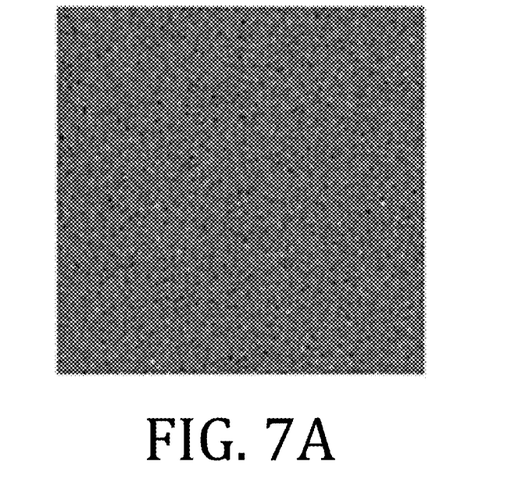
FIG. 7A is an exemplary 128×128 pixel mask.
Figure 7B:
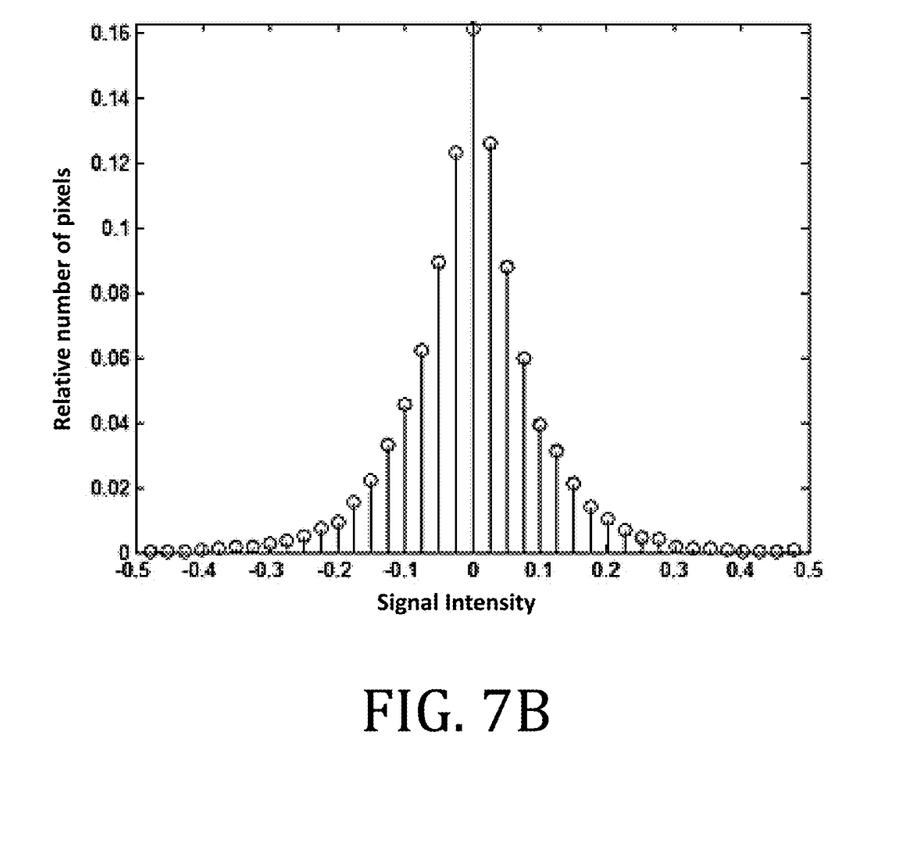
FIG. 7B is a graphical representation of impulse noise distribution as employed by the method of FIGS. 2A and 2B with the mask of FIG. 7A.

The noise masks result from multiplying each image of the plurality or pluralities by maximums of the expected values, M (Equation 6). Exemplary resultant masks are shown in FIGS. 5A, 6A, and 7A for each of sensor noise sources 140 (FIG. 1), quantization noise sources 142 (FIG. 1), and impulse noise sources 144 (FIG. 1), respectively. Exemplary distributions of signals for the masks are shown in FIGS. 5B, 6B, and 7B, respectively.

While thermal noise is an unpredictable source of noise, when analyzing thermal noise in the frequency domain, the spectrum is essentially flat, meaning that it has the same noise power in each part of the spectrum. Thus, thermal noise can act as an example of a broadband noise source. It also, given its frequency response, may be characterized by a Gaussian distribution function, which may be employed to create a thermal noise mask for purposes of the method 200.

To characterize thermal noise, and thus create a corresponding noise mask, those skilled in the art will appreciate that thermal noise can be represented as electrical power being dissipated by resistive elements in a component or system. More specifically, for a resistor, R, at temperature, T, connected to a matched load, the average noise power $P_N$ in 1 Hz bandwidth may be calculated as follows:

$$P_N = kT \quad \text{Equation 7}$$

The rms noise voltage for thermal noise can be given as follows:

$$V_{noise}(\text{rms}) = \sqrt{4kTR} \quad \text{Equation 8}$$

As to quantization noise, intensity values from an imaging sensor array may be digitized by an A/D converter to an integer value between 0 and a maximum value, N, with each integer representing a discrete quantization level. The discrete quantization levels or maximum value, N, may be determined by the number of bits available for quantization. For an n bit quantizer, the maximum number of quantization levels is defined as $2^n$. In an imaging system, the quality of the image is, in turn, dependent, at least in part, on the number of quantization levels. The quantization level/digitized output value of an A/D converter count may also be referred to as ADU (Analog to Digital Units).

Those skilled in the art will further appreciate that the difference between each signal level represented by an integer value or quantization level, is the resolution or step size 'S' of the A/D converter, defined as follows:

$$S = \frac{S_{max} - S_{min}}{2^n - 1} \quad \text{Equation 9}$$

where $S_{max}$ is a maximum measurable quantization level and $S_{min}$ is a minimum discernable or detectable signal. As mentioned before, the number of discrete amplitude values that may be developed with an analog to digital converter with n bits is $2^n$. When accounting for sign in the amplitude values, one quanta level to be lost. Thus, quantizing a number to "n+1" bits that may take on positive or negative sign will yield $2^n$ levels. The quantizer step size, S, is then the full-scale value divided by $2^n$, meaning that S can be rewritten from Equation 9 as follows:

$$s = \frac{2N}{2^{n+1}} = \frac{N}{2^n} \quad \text{Equation 10}$$

where N is the maximum value that may be digitized by the analog to digital converter. The effects of quantization at each measurement point or quantization event due to the 2's complement rounding error may be assumed to be zero mean white noise processes. This error distribution at each quantization event can be represented as a uniformly distributed random variable over the range of the A/D converter, as follows:

$$\text{Range} = -\left(\frac{N}{2}\right)2^{-n} \text{ to } \left(\frac{N}{2}\right)2^{-n} \quad \text{Equation 11}$$

Each error source then has a variance of $$\frac{N^2 2^{-2n}}{12}$$

and is uncorrelated with each other. Therefore, the quantization realized at each frequency measurement point in the step frequency measurement process may be characterized by random noise uniformly distributed with a variance of $$\frac{N^2 2^{-2n}}{12}$$

and with a mean of zero.

The quantization noise may be expressed approximately as additive uniform distribution with zero mean and variance as follows:

$$\sigma^2 = \frac{s^2}{12},$$

alternatively:

$$V_{rms} = \left(\frac{1}{\sqrt{12}}\right) ADU \quad \text{Equation 12}$$

This approximation may change if the sampling signal or the clock components are present in the signal to be digitized, or if the architecture of the A/D converter allows auto ranging. Those skilled in the art, however, will appreciate that from this distribution, a corresponding noise mask for purposes of method 200 can be generated.

With noise masks generated (Block 254, Block 256), composite first and second images are generated (Block 258, 260) by adding the noise masks to the first and second images, respectively. As noted above, and depending on whether the designated noise profiled is individual assessment, additive assessment, or multiplicative assessment of the noise sources 140, 142, 144, (FIG. 1) the noise masks may be added to the first and second images in a respective manner. For example, when evaluating the combined effects of sensor noise sources 140 (FIG. 1) and quantization noise sources 142 (FIG. 1), the masks may be added cumulatively to the first and second images.

The first and second composite images generated may then be used to simulate the computer vision algorithm under investigation (Block 262). Solution results for the initial evaluation value may be evaluated, and a measure of performance of the computer vision algorithm of the image character determined (Block 264). For example, when the computer vision algorithm is configured to recognize a pattern or detect change (i.e., the image characters), the measure of performance may be a similarity measure, such as a matched filter, a normalized cross correlation ("NCC"), or an information theoretic measure. In other examples, when the computer vision algorithm is an image registration algorithm, the measure of performance may be a rotational transform, such as an angle of rotation, or a translation transform. The skilled artisan having the disclosure provided herein would readily appreciate suitable measures of performance given a particular computer vision algorithm.

After the measure of performance is determined for the initial evaluation value, whether measures of performance for all values within the evaluation range is evaluated (Decision Block 266). If additional values within the evaluation range exist ("NO" branch of Decision Block 266), then a new evaluation value within the evaluation range is designated (Block 268), and the process returns to determining reference noise levels using the new evaluation value (Block 250, Block 252). The new evaluation value may be randomly assigned from values within the evaluation range, incrementally increased from the initial evaluation value, or assigned in another appropriate manner known to those of ordinary skill in the art.

If measures of performance for all values within the evaluation range have been determined ("YES" branch of Decision Block 266), then the process continues with the measures of performance being compared (Block 270). Comparison may include a statistical evaluation or, as illustrated in FIG. 8, include a graphing the measures of performance to visual evaluation.

Figure 8:
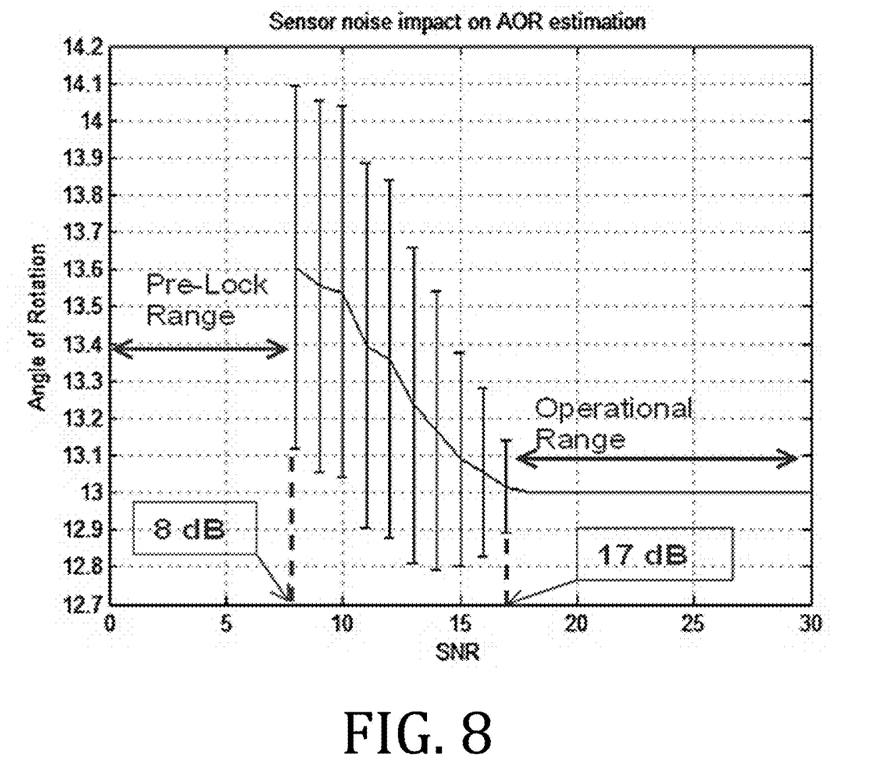
FIG. 8 is a graphical representation of a computer vision algorithm performance in the presence of sensor noise according to embodiment of the present invention.

With reference now to the exemplary FIG. 8, the measures for sensor noise source impact on image registration algorithm performance for a particular imaging system are compared. Here, the evaluation range was 0 dB to 30 dB, and the measure of performance was the angle of rotation. At SNR levels below 8 dB, no angle of rotation was determined, which was attributed to the algorithm's inability to complete similarity analysis due to noise levels. At SNR levels ranging from 8 dB to 17 dB, the algorithm could lock on an angle of rotation; however, there were a number of failures. Said another way, while an angle of rotation was determinable, the acceptable tolerance, standard deviation, average values, mean values, or other variances were deemed inappropriate for the intended purpose. At SNR values greater than about 22 dB, the angle of rotation was easily determined with few to no variation, and this range may be designated as an operational range in which the algorithm is expected to function properly (Block 280, FIG. 2B).

Figure 9:
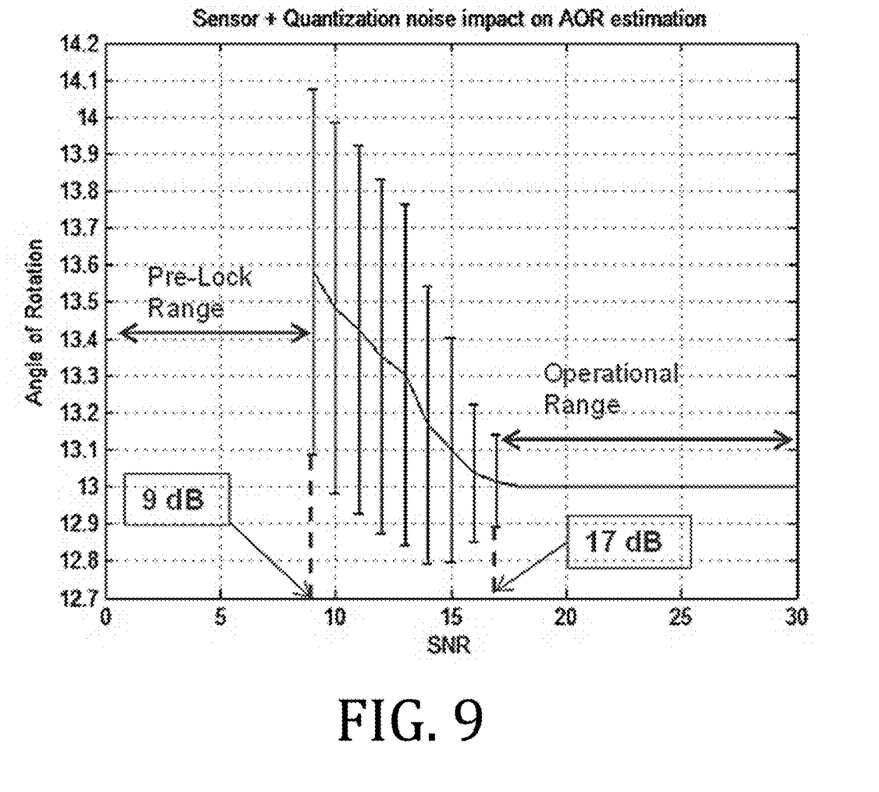
FIG. 9 is a graphical representation of a computer vision algorithm performance in the presence of sensor noise and quantization noise according to embodiment of the present invention.

FIG. 9 provides another exemplary comparison for measures of performance of sensor and quantization noise sources on the image registration algorithm. Again, the operational range was determined to be from 22 dB to 30 dB. As shown, at SNR levels below 9 dB, the algorithm was unable to determine an angle of rotation due to noise levels.

Additional details of the evaluations presented in FIGS. 8 and 9 are presented below in the Examples.

Returning again to FIG. 2B, and with the operational range identified, the process may end.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1

FIG. 8 illustrates the results of an exemplary analysis of the potential impact of sensor noise on the performance of a computer vision algorithm. The computer vision algorithm was a correlation-based, image registration algorithm, and the measure of performance is an angle of rotation. In the exemplary analysis, the threshold condition is defined as whether the angle of rotation provided by the computer vision algorithm converges on a common value with a zero failure rate over the course of a Monte Carlo simulation, where 256 runs of the computer vision algorithm were performed at a reference noise level. The 256 runs applied 256 instances of noise as part of a plurality of noise masks having a reference noise level. The operational range values are defined as signal-to-noise ratios ranging from 0 dB to 30 dB, and correspond to the image intensity values for an image pair in the presence of sensor noise. At a zero failure rate condition, the operational range is defined as a signal-to-noise ratio greater than 17 dB.

As shown, at an operational range value of less than 8 dB the computer vision algorithm was unable to perform at a zero-failure rate for all noise instances in the presence of sensor noise. When the threshold condition is changed such that a mean value of angle of rotation and an acceptable standard deviation value or variance value resulting from the multiple instances of noise is used instead of a zero failure rate, the operational range can be defined in terms of a variance or threshold condition value, which according to the exemplary analysis, begins at an operational range value of 8 dB. When the image intensity values of an image pair are between 8 dB and 17 dB, one or more pre-processing steps could be taken, as suggested above, to increase the image intensity values of the image pair for purposes of expanding the operational range of an imaging system. As the image intensity values increased, the standard deviation associated with solutions being provided by the computer vision algorithm may get closer to the mean, and a common value will emerge. Once the image intensity value reaches 17 dB, the angle of rotation provided by the correlation-based, image registration algorithm, locks on to a constant value.

Example 2

Referring now to FIG. 9, the results of an exemplary analysis 700 of potential impact of quantization noise on the operational range of a computer vision algorithm is provided. As indicated above with reference to FIG. 1, the noise sources of an imaging system may be added to the sensor noise and the calculations performed to provide the results of FIG. 8 may be repeated for the additional source of noise. In the exemplary analysis, quantization noise added to sensor noise has minimal impact on algorithmic performance, and by the 17 dB mark (same as sensor noise model from FIG. 8. above), angle of rotation 710 is locked on at a constant value. The difference or impact is at lower SNR ratios. With sensor noise alone (from the example of FIG. 8), the computer vision algorithm locks on with variance at 8 dB with no failures, but with quantization noise added (from the example in FIG. 8) the algorithm loses 1 dB and the pre-lock range is extended to 9 dB.

The results of an exemplary analysis 800 of potential impact of impulse noise on the operational range of a computer vision algorithm are provided. When adding the impulse noise to sensor and quantization noise, performance is affected to a greater degree than when only quantization noise is added to the sensor noise. The zero failure with variance for angle of rotation 810 at lower SNR values 820 increases to 10 dB and the constant value lock moves from 17 dB with sensor plus quantization noise to 19 dB with impulse noise added.

Thus, determining the effect of noise and other uncertainties on the performance of an imaging system, or components thereof, can be useful for optimizing the design and performance of those systems. Such uncertainties, as shown in FIGS. 6-8, may impact or limit the operational range of these systems. Therefore, some of the illustrative aspects of the present invention may be advantageous in solving problems associated with uncertainties in imaging systems and other problems not discussed which are discoverable by a skilled artisan.

Uncertainties resulting from noise from one or more sources within a system may be modeled as noise. According to embodiments of the present invention described herein, a theoretically or empirically-based noise model may be varied as a function of SNR associated with an image pair to identify noise effects on the operation of the imaging system, includes the system's computer vision algorithm. When varied over a range of SNR values, wherein the range of values represent increasing levels of noise in relation to the image intensity values while using one or more conditions to determine when the system is operating reliably, an operational range of the system may be determined as a function of those values.

Because such models present noise as a random variation in signal, noise may be analyzed statistically. Even so, the model may be simulated stochastically, such as by Monte Carlo methods, to arrive at a solution within a range of possible solution values representing various degrees of confidence.

Using embodiments of the present invention, designers and operators of imaging system may optimize imaging system performance. For instance, the imaging system performance, when one or more uncertainties are present, could be optimized by selectively employing image conditioning techniques to improve image intensity values for a given image or by selecting a more resilient computer vision algorithm.

Image registration provides an illustrative embodiment of how algorithms relate to an imaging system's performance and how uncertainties associated with operation of the system may hinder performance.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of determining an operational range for a computer vision algorithm, the method comprising:
receiving a first image and a second image from an imaging system, each of the first and second images characterized by an image intensity value;
iteratively, applying an evaluation value of a noise profile to the first and second images to yield first and second composite images, respectively, and measuring performance of the computer vision algorithm on the first and second composite images;
comparing the measure of performances; and
determining an operational range of the computer vision algorithm from the comparison, wherein the noise profile includes at least one source of noise inherent to the imaging system.

2. The method of claim 1, wherein the first and second images are of a spectra type selected from the group consisting of visible band, short-wave infrared (SWIR) band, mid-wave infrared (MWIR) band, and long-wave infrared (LWIR) band.

3. The method of claim 1, wherein the at least one source of noise is selected from the group consisting of sensor noise sources, quantization noise sources, and impulse noise sources.

4. The method of claim 1, wherein applying the evaluation value of the noise profile further comprises:
generating first and second noise masks for the first and second images, respectively.

5. The method of claim 4, further comprising:
scaling the first and second noise masks to maximum image intensity values of the first and second images, respectively.

6. The method of claim 1, wherein the computer vision algorithm is selected from the group consisting of pattern recognition, image registration, change detection, and rotational transform.

7. The method of claim 6, wherein the computer vision algorithm is a rotational transform and the measure of performance is an angle of rotation.

8. The method of claim 1, wherein comparing the measure of performances includes selecting a minimum value, a maximum value, an average value, a standard deviation, and a variance.

9. The method of claim 1 wherein the evaluation value is within an evaluation range.

10. A system for determining an operational range of a computer vision algorithm of an imaging system, the system comprising:
a processing module configured to perform the method of claim 1.

11. The system of claim 10, wherein the processing module further comprises:
a receiving module configured to receive the first and second images.

12. The system of claim 10, wherein the computer vision algorithm is selected from the group consisting of pattern recognition, image registration, change detection, and rotational transform.

13. The system of claim 10, wherein the measure of performance is selected from the group consisting of a matched filter, a normalized cross correlation, and an information theoretic measure.

14. An imaging system characterized by one or more sources of noise and having a computer vision algorithm, the system comprising:
an imaging sensing module for capturing a target image, the target image being characterized by the image intensity value; and
a processor configured to derive a first image and a second image from the received target image and to perform the method of claim 1 thereon.

15. The imaging system of claim 14, wherein the imaging system further comprises:
an image conditioning module configured to receive the target image and adjust the image intensity value thereof.

16. The imaging system of claim 15, wherein the image conditioning module comprises at least one of a filter, an amplifier, and a signal processing routine.

17. The imaging system of claim 15, wherein the imaging system is associated with at least one of a sensor noise source, a quantization noise source, and an impulse noise source.

* * * * *